May 7, 1935.                    H. G. NALL                    2,000,143
                                LAWN MOWER
                       Original Filed May 13, 1932

Inventor
Harry Greaves Nall,
by Royal E. Burnham,
attorney.

Patented May 7, 1935

2,000,143

UNITED STATES PATENT OFFICE 2,000,143

LAWN MOWER

Harry Greaves Nall, Sydney, New South Wales, Australia

Application May 13, 1932, Serial No. 611,209. Renewed October 26, 1933. In Australia May 14, 1931

3 Claims. (Cl. 56—294)

This invention relates to lawn mowers of the type in which spirally arranged beater-blades carried by a horizontal shaft of a reel are revolved to press the grass against a bottom blade, and has been devised to ensure rapid setting and automatic sharpening of the bottom blade.

In my invention the bottom blade floats on pivot pins carried by the framing and is fitted with rearwardly extending metal arms each of which is downwardly pressed by adjustable resilient pressure means so that the cutting edge of the bottom blade is automatically maintained in contact with each beater-blade in turn when the reel shaft is revolved.

To ensure contact of each portion of the beater-blades with the bottom blade the ends of those blades are secured to a vertical metal ring or disk thus preventing oscillation of the ends of the beater blades, and the intermediate portions of the blades are secured to the reel-shaft by the usual spider arms.

In the accompanying drawing which illustrates one form of a hand driven lawn mower:—

Figure 1:
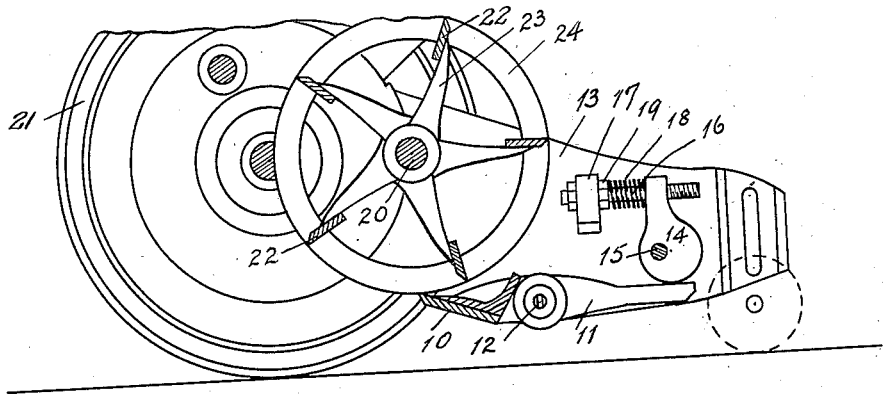
Fig. 1 is a sectional side elevation of portion of a lawn mower.
Figure 2:
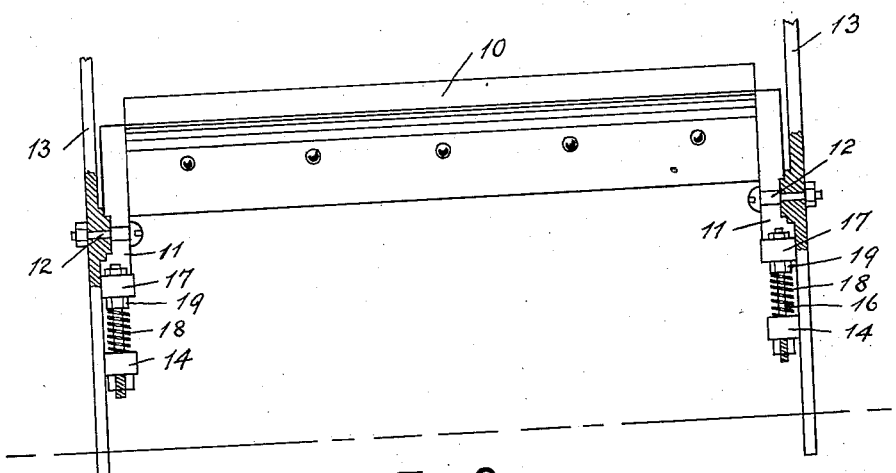
Fig. 2 is a plan partly in section of the rear portion of the machine, the beaters, driving wheels, rear roller, and other known usual parts being omitted.

The horizontal bottom cutting blade 10 is fitted at each end with a rearwardly extending metal arm 11, each arm being pivoted on a threaded pin 12 which projects inwardly from the inner face of the usual framing 13. The blade 10 thus floats on the pins 12.

Cam faced members 14, pivotally mounted one on each inner side of the framing 13 by means of pins 15 fixed to the framing, are adapted to press downwardly on the upper surfaces of the rear portions of the metal arms 11.

An adjustable threaded bolt 16, mounted in a boss 17 on the framing 13, passes freely through an aperture in the upper end of the member 14, and a compression spring 18, adjustable by means of a nut 19, is mounted about the bolt 16 between the nut 19 and the member 14. The spring 18 may be replaced by a suitably positioned tension spring or by a counter-weight which is arranged to press the upper portion of the member 14 towards the rear of the machine.

The framing 13, which is of the usual construction, is fitted with the usual reel-shaft 20 which is adapted to be rotated by the driving wheels 21 through the usual gearing within the wheels.

The beater-blades 22 are arranged in the usual spiral manner about the shaft and are secured thereto by the usual spiders 23, and to prevent independent oscillation of the ends of the beater-blades these ends at each side of the machine are secured to a vertical metal ring 24, the edges of the beater-blades being flush with the circumference of the ring.

The compression of each spring 18 is adjusted by means of the nuts 19 so that the cam faced members 14 bear against the upper surfaces of the rear ends of the metal arms 11 and raise the cutting edge of the bottom blade 10 into contact with the edge of each beater-blade in turn when the reel-shaft is revolved. As the blade 10 wears the pressure of the springs 18 automatically maintains the cam faced members in contact with the metal arms and the cutting blade in contact with the beater-blades so that the machine is self sharpening.

I claim:—

1. A lawn-mower comprising in combination a framing, a reel, a substantially horizontal bottom cutting-blade pivotally mounted on a pin at each side of the framing, a rearwardly-extending arm secured to each end of the blade, and cam-faced members pivoted on the framing and adapted to contact with the rear portions of said arms.

2. A lawn-mower comprising in combination a framing, a reel, a pin projecting inwardly from each side of the framing, a substantially horizontal cutting-blade provided at each end with a rearwardly-extending arm and pivotally mounted on said pins, a cam-faced member pivoted on each inner side of the framing, and a spring mounted on each inner side of the framing urging one of said cam-faced members into contact with the rear portion of one of said arms.

3. A lawn-mower comprising in combination a framing, a reel mounted on the framing, rearwardly-extending arms pivotally mounted one on each side of the framing, a substantially horizontal cutting-blade mounted on the front portions of said arms and normally in contact with said reel, cam-faced members pivoted one on each side of the framing and adapted to contact with the rear portions of said arms, and springs carried by the framing urging said cam-faced members in contact with said arms whereby to maintain said blade in contact with said reel.

HARRY GREAVES NALL.